US012423026B2

(12) United States Patent
Wu et al.

(10) Patent No.: US 12,423,026 B2
(45) Date of Patent: Sep. 23, 2025

(54) OBFUSCATION OF DATA IN A MEMORY

(71) Applicant: Cryptography Research, Inc., San Jose, CA (US)

(72) Inventors: Winthrop John Wu, Pleasanton, CA (US); Bryan Wang, South Lake Tahoe, CA (US); Marufa Kaniz, Santa Clara, CA (US); Guilherme Ozari de Almeida, Nootdorp (NL); Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 18/531,350

(22) Filed: Dec. 6, 2023

(65) Prior Publication Data
US 2024/0211171 A1  Jun. 27, 2024

Related U.S. Application Data

(60) Provisional application No. 63/434,837, filed on Dec. 22, 2022.

(51) Int. Cl.
*G06F 3/06* (2006.01)
(52) U.S. Cl.
CPC .......... *G06F 3/0658* (2013.01); *G06F 3/0619* (2013.01); *G06F 3/0679* (2013.01)

(58) Field of Classification Search
CPC ..... G06F 3/0658; G06F 3/0619; G06F 3/0679
See application file for complete search history.

(56) References Cited

U.S. PATENT DOCUMENTS

| 6,625,685 | B1 | 9/2003 | Cho et al. |
| 10,089,495 | B2 * | 10/2018 | Ciordas ................. G06F 21/79 |
| 11,093,588 | B2 * | 8/2021 | Morgan ............... G06F 12/145 |
| 2016/0048457 | A1 * | 2/2016 | Hars ..................... G06F 21/755 |
| | | | 711/163 |
| 2016/0103626 | A1 * | 4/2016 | Hars ..................... G06F 21/556 |
| | | | 711/103 |
| 2016/0276002 | A1 | 9/2016 | Lee |
| 2021/0049309 | A1 * | 2/2021 | Su .......................... G06F 3/062 |
| 2021/0119763 | A1 * | 4/2021 | Weiner ................. G06F 21/606 |

* cited by examiner

*Primary Examiner* — Edward J Dudek, Jr.
(74) *Attorney, Agent, or Firm* — Lowenstein Sandler LLP

(57) ABSTRACT

A request to perform a memory operation addressed to a first address corresponding to a first logical unit of logical units of a memory is received. Address mask data that corresponds to the logical units is identified. Multiple transformed addresses are determined using the first address and the address mask data. The transformed addresses can include a target address corresponding to the first logical unit and additional addresses corresponding to other logical units. The memory operation is performed at the target address corresponding to the first logical unit and dummy memory operations are performed at the additional addresses corresponding to the additional logical units.

21 Claims, 7 Drawing Sheets

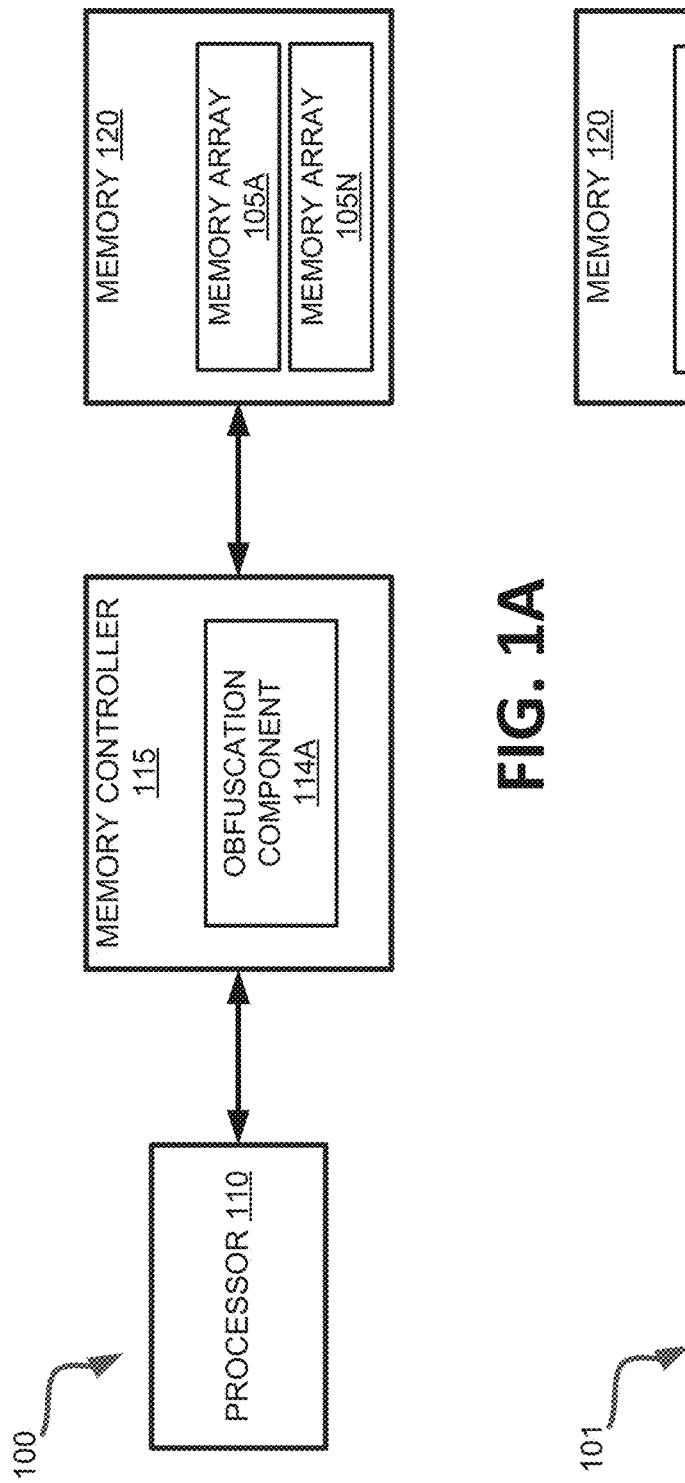
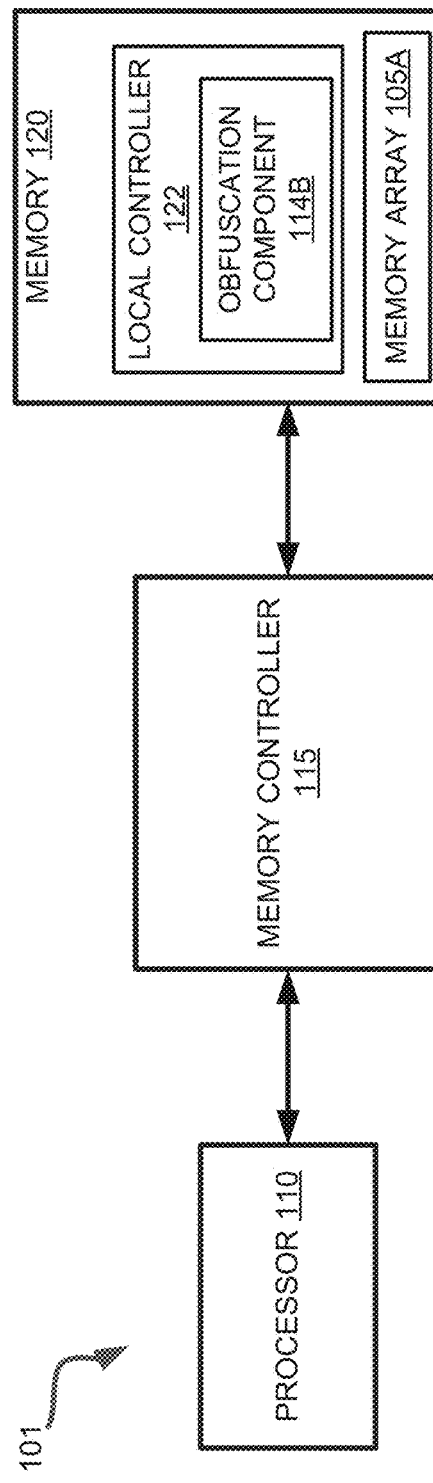
FIG. 1A
FIG. 1B

OBFUSCATION OF DATA IN A MEMORY

RELATED APPLICATIONS

This application claims the benefit of U.S. Patent Application No. 63/434,837, filed Dec. 22, 2022, entitled "OBFUSCATION OF DATA IN A MEMORY", which is incorporated by reference herein.

TECHNICAL FIELD

Aspects and embodiments of the disclosure relate to memory systems, and more specifically, to systems and methods for obfuscating data in memory of memory systems.

BACKGROUND

A memory system can include one or more memory that store data. The memory can be, for example, non-volatile memory (e.g., Flash memory) and volatile memory (e.g., SRAM, DRAM, etc.). In general, a computer system can utilize a memory system to store data in the memory and retrieve data from the memory. There are many techniques to keep data stored in memory secure, such as encrypting the data stored within the memory and other techniques.

BRIEF DESCRIPTION OF THE DRAWINGS

The present disclosure is illustrated by way of example, and not by way of limitation, in the figures of the accompanying drawings.

FIG. 1A illustrates an example computing system that includes a memory system, in accordance with some embodiments of the present disclosure.

FIG. 1B illustrates an example computing system that includes a memory system, in accordance with some embodiments of the present disclosure.

DETAILED DESCRIPTION

Figure 1C:
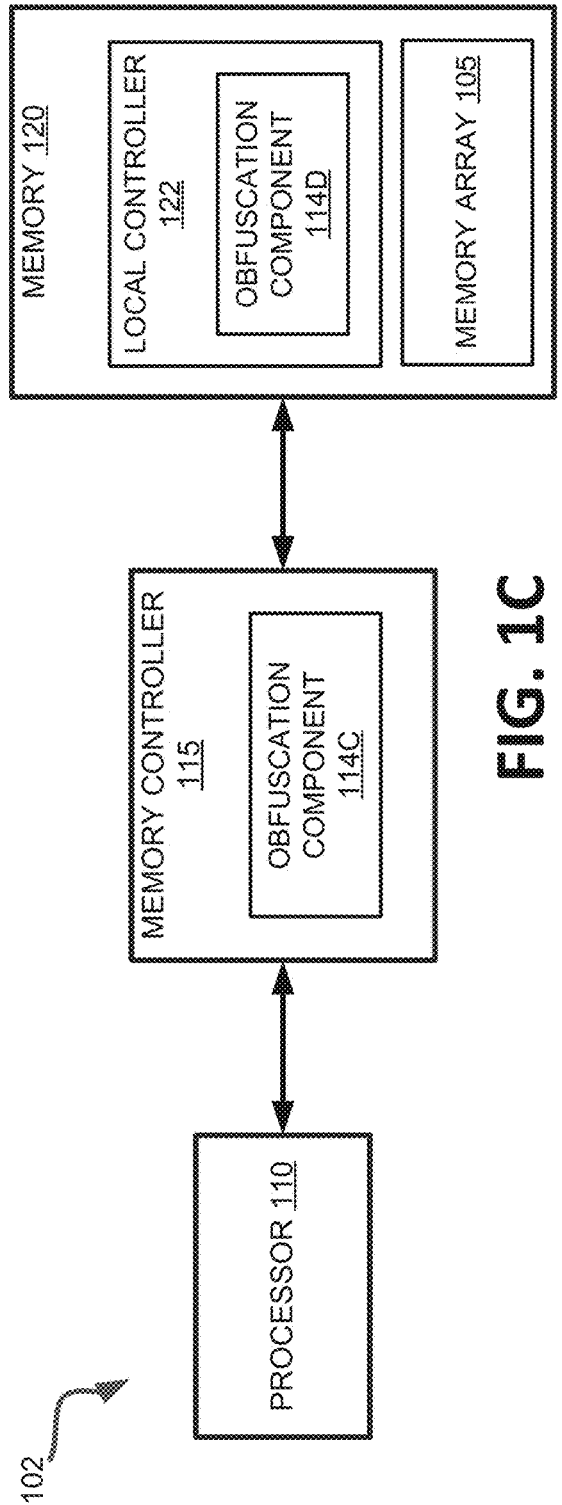
FIG. 1C illustrates an example computing system that includes a memory system, in accordance with some embodiments of the present disclosure.

The embodiments described herein describe technologies of a memory system for protection of data in a memory. In some embodiments, the memory system can include a memory and a memory controller. A "memory" can refer to one or more memory circuits. Memory circuit can refer to one or more memory circuits within the same chip (i.e., "on-chip memory"), within a separate discrete chip (i.e., "off-chip memory") and even within the same packaged but formed on separate chip (i.e., "co-packaged memory"). A memory can include a non-volatile memory (e.g., Flash, MRAM, etc.) and/or volatile memory (e.g., SRAM, DRAM, etc.), unless otherwise described. Examples of memory and controllers are described below in conjunction with FIG. 1. In general, a processor, such as of a host, can utilize a memory system that includes one or more components, such as a memory and a memory controller. The processor can provide data to be stored at the memory and can request data to be retrieved from the memory.

In some instances, a memory can include memory cells arranged in a two-dimensional array. Memory cells may be etched onto a silicon wafer in an array of columns and rows to form a memory array. For example, static random access memory (SRAM) memory cells can be made of multiple metal-oxide-semiconductor field-effect transistors (MOSFETs). The intersection of a row and a column may correspond to the address of the memory cell. A cell may be an electronic circuit that stores data. Depending on the cell type, a cell can store one or more bits of binary data and may have various logic states that correlate to the number of bits stored. The logic states can be represented by binary values, such as "0" or "1", or a combination of such values. A memory may be further divided into logical units (also referred to as "logical memory units," "memory banks" or "banks" herein) in order to manage complexity and provide increased performance. A logical unit may refer to a designated logical partitioning of physical memory cells. In some cases, a logical units can be spread across one chip (e.g., integrated circuit (IC) die) that includes multiple memory circuits, or multiple chips each of which include multiple memory circuits. In some embodiments, a memory controller can determine the logical partitioning of physical memory cells that make up the logical units. A processor (e.g., host) can provide data and an address corresponding to a location within the memory to store the data (e.g., a write request). Additionally, the processor can provide an address corresponding to a location within the memory and a request to retrieve the data stored at that address (e.g., a read request). The memory system can generate an address mapping between addresses provided by the processor (e.g., logical addresses) and a corresponding location within the memory (e.g., physical addresses).

In some cases, the data stored at and communicated with a memory can include sensitive data, such as sensitive user data, cryptographic keys (also referred to as "keys" herein) and usage patterns. As such, an adversary may maliciously utilize techniques such as invasive probing, photonic analysis, and/or side-channel analysis to extract data (e.g., sensitive data) stored at and communicated with the memory. To control the amount of data that can be maliciously extracted, the memory system may encrypt the data prior to storage within the memory. However, such encryption can still be vulnerable to malicious attacks, such as invasive probing, semi-invasive photonic emission analysis, or non-invasive power-supply analysis. For example, an adversary can utilize laser voltage probing to measure a signal on a data bus connecting a key storage memory and a security processor to extract cryptographic keys. The extracted cryptographic keys can be used to decrypt the encrypted data stored within the memory. In another example, the memory system can create a memory mapping from logical addresses to physical addresses (e.g., address map) to prevent data from being extracted. However, a location within the memory where the data is stored can still be identified via invasive probing. For instance, an adversary can probe memory locations within the memory to observe and identify activity (e.g., spatial correlation) within the memory and ascertain the memory mapping.

Aspects of the present disclosure address at least the above challenges among others by providing improved systems and methods to protect data of a memory using various obfuscation techniques as described herein, such that different processor-requested memory operations (e.g., read operation, write operation, or partial write) performed at the same or different memory address(es) are performed in a similar manner. Further, and in some instances the data stored within the memory can be re-encrypted using different keys from one memory operation to the next memory operation.

In some embodiments, a memory system can obfuscate memory addresses (also referred to as "logical addresses" herein) and perform dummy memory operations within the memory. For example, a memory system can receive (e.g., from a processor) a request to perform a memory operation at a memory address within a logical unit of multiple logical units of the memory. To obfuscate the memory address (and the corresponding memory operation), the memory system can use address mask data to transform the memory address into multiple transformed addresses (e.g., target address and one or more dummy addresses). For instance, a single memory address identified by the memory operation can be transformed into multiple transformed addresses where each of the transformed addresses corresponds to a particular logical unit of the memory. In some embodiments, the address mask data (also referred to "address transformation data" herein) can be data, such as a bit string, used to transform original data (e.g., a memory address) to transformed data (e.g., a transformed address) in a similar format of that original data. For example, address mask data may transform a memory address into a transformed address of a similar format of the memory address such that the memory may recognize the transformed address as an addressable memory location within the memory.

In some embodiments, the transformed addresses can include a target address and one or more dummy addresses. The target address may correspond to a location within a memory where the requested memory operation is to be performed. For example, the write data that is requested to be written by the write operation is written to the target address. The dummy addresses may correspond to locations within the memory where the dummy memory operations are to be performed. For example, dummy write data that is not requested to be written by the requested write operation is written to dummy addresses.

In some embodiments, in performing any requested memory operation (e.g., read operation or write operation), both a read operation and a write operation can be performed using the target address and the one or more dummy addresses. For example, for a requested read operation identifying a memory address of a logical unit, a read operation can be performed at a target address to read target data and at the one or more dummy addresses (e.g., dummy read operation) to read respective dummy data. The read operation can be followed by a write operation that writes the corresponding data accessed from previous read operation to the target address (e.g., target data) and the one or more dummy addresses (e.g., dummy write operation to write corresponding dummy data). If the processor requests a write operation to be performed, the memory system can perform a read operation and a subsequent write operation in a similar manner as described above, such that any type of requested memory operation performed at the memory is performed in a similar manner.

In some embodiments, and in particular embodiments implementing volatile memory, new address mask data may be generated at every power cycle of a memory. A power cycle of the memory may be the process of disconnecting electrical power to a memory followed by the re-supplying of electrical power to the memory. Data stored at volatile memory may be lost over a power cycle. It can be noted that in some embodiments, for a particular memory address identified in a memory operation, the same target address and one or more dummy addresses can be generated using the same address mask data (e.g., address mapping). To further obfuscate the address mapping between the requested memory address and the target and dummy addresses generated using the address mask data, new address mask data can be generated after every power cycle such that for the same requested memory address new target addresses and new dummy addresses can be generated using the new address mask data.

To further protect data of a memory, each logical unit can be associated with a set of cryptographic keys. In some instances, the set of cryptographic keys associated with each logical unit can be a different set of cryptographic keys. In an example and as noted above, the target address and one or more dummy addresses are generated based on the memory address identified for the requested memory operation and the address mask data. A read operation and write operation can be performed irrespective of whether the requested memory operation is a read operation or a write operation. To perform a dummy memory operation, the controller of a memory system can perform a read operation and a write operation at a corresponding dummy address. To perform the read operation, data (referred to as "dummy data" herein) stored at the dummy address can be decrypted using a first key of a set of cryptographic keys that corresponds to a respective logical unit. The write operation can include encrypting the decrypted dummy data using a second key of the set of cryptographic keys and writing the encrypted data back to the dummy address. The underlying data (e.g., original unencrypted data) associated with the dummy address may not change, but may appear to change as the underlying data has been re-encrypted with a new key. To perform the requested memory operation, the controller of a memory system further can perform a read operation and a write operation at the target address. For example, performing the read operation may include decrypting data (referred to as "target data" herein) stored at the target address using a first key of another set of cryptographic keys associated with the respective logical unit. If the requested memory operation is a read request, the memory controller may send the decrypted target data to the processor. Performing the write operation may include encrypting the target data using a second key of the other set of cryptographic keys. If the requested memory operation is a write request, the memory request can include write data. The memory may encrypt the write data using the second key. Performing the write operation may include writing the re-encrypted target data or encrypted write data to the target address. In some embodiments, cryptographic keys associated with the above encryption operations can be stored within the memory for performance of subsequent encryption and decryption operations. In some embodiments and in particular embodiments implementing volatile memory, new sets of cryptographic keys may be generated every power cycle of the memory.

As noted, a technical problem addressed by embodiments of the present disclosure is a lack of technical architecture that limits or prevents malicious extraction of data associated with a memory of a memory system.

At technical solution to the above-identified problem may include one or more of memory address obfuscation, memory operation obfuscation, and/or encryption and re-encryption techniques that protect data of a memory.

Thus, the technical effect may include a more secure memory system that limits or prevents the malicious extraction of data (e.g., via invasive probing, photonic analysis, and side-channel analysis, etc.) associated with the memory system that includes a memory, such as a volatile memory.

FIG. 1A illustrates an example computing system 100 that includes a memory system in accordance with some embodiments of the present disclosure. The memory system can include a memory controller 115 and a memory 120. The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a processor 110, such as of a host, that is operationally coupled to memory controller 115. In some embodiments, the processor 110 is operationally coupled to memory controller 115 that may be a part of different types of memory systems. FIG. 1A illustrates one example of a processor 110 operationally coupled to memory controller 115. As used herein, "coupled to" or "coupled with" generally refers to a connection between components, which can be an indirect communicative connection or direct communicative connection (e.g., without intervening components), whether wired or wireless, including connections such as electrical, optical, magnetic, etc. The processor 110 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The processor 110 uses the memory controller 115, for example, to write data to the memory 120 and read data from the memory 120.

The memory 120 can include any combination of the different types of non-volatile memory and/or volatile memory. The volatile memory can be, but are not limited to, random access memory (RAM), such as dynamic random access memory (DRAM), static random access memory (SRAM) and synchronous dynamic random access memory (SDRAM). The memory 120 can include one or more memory arrays 105A through 105N (referred to generally as "memory array 105" herein) composed of memory cells. The memory 120 can also include additional circuitry or components that are not illustrated. In some embodiments, the memory 120 can include a cache or buffer (e.g., DRAM) and address circuitry (e.g., a row decoder and a column decoder) that can receive an address from the memory controller 115 and decode the address to access the memory 120.

A memory controller 115 (or controller 115 for simplicity) can communicate with the memory 120 to perform operations such as reading data, writing data, or erasing data within the memory 120 and other such operations. The memory controller 115 can include hardware such as one or more integrated circuits and/or discrete components, a buffer memory, or a combination thereof. The hardware can include a digital circuitry with dedicated (i.e., hard-coded) logic to perform the operations described herein. The memory controller 115 can be a microcontroller, special purpose logic circuitry (e.g., a field programmable gate array (FPGA), an application specific integrated circuit (ASIC), etc.), or other suitable processor.

In general, the memory controller 115 can receive commands or operations from the processor 110 and can convert the commands or operations into instructions or appropriate commands to achieve the desired access to the memory 120. The memory controller 115 can be responsible for other operations such as wear leveling operations, garbage collection operations, refresh operations, error detection and error-correcting code (ECC) operations, encryption operations, caching operations, and address translations between a logical address (e.g., logical block address (LBA), namespace) and a physical address (e.g., physical block address) that are associated with the memory 120.

In some embodiments, memory controller 115 can implement an obfuscation component 114A. In one embodiment, obfuscation component 114A can receive a request to perform a memory operation at a memory address corresponding to a first logical unit of multiple logical units of a memory 120. Obfuscation component 114A can identify address mask data that correspond to the logical units. Obfuscation component 114A can determine multiple transformed addresses using the memory address and address mask data. For example, a single memory address can be transformed into multiple transformed addresses where each of the transformed addresses corresponds to a particular logical unit of the memory. In one embodiment, the transformed addresses can include a target address and additional addresses (also referred to as "dummy addresses" herein). The target address can correspond to the first logical unit and the dummy addresses can correspond to other logical units of the memory. In some embodiments, obfuscation component 114A can perform the memory operation at the target address and dummy memory operations at the dummy addresses. Further details with regard to the operations of obfuscation component 114 are further described below.

FIG. 1B illustrates an example computing system 101 that includes a memory system, in accordance with some embodiments of the present disclosure. The memory system can include a memory controller 115 and a memory 120, as described with respect to FIG. 1A. The computing system 101 can include a processor 110 that is coupled to memory controller 115, as described with respect to FIG. 1A.

In some embodiments, the memory 120 includes a local controller 122 that operates in conjunction with memory controller 115 to execute operations on one or more memory cells of the memory 120. An external controller (e.g., memory controller 115) can externally manage the memory 120 (e.g., perform media management operations on the memory 120). In some embodiments, a memory 120 is a managed memory 120, which is a raw memory 120 having control logic (e.g., local controller 122) on the chip and a controller (e.g., memory controller 115) for media management within the same memory package. An example of a managed memory is a managed DRAM device. Memory 120, for example, can represent a single chip having some control logic (e.g., local controller 122) embodied thereon. In some embodiments, local controller 122 can be responsible for overseeing, controlling, and/or managing data access operations, such as programming operations, performed on the memory array 105 of memory 120. In some embodiments, local controller 122 includes obfuscation component 114B. Obfuscation component 114B can perform similar operations of obfuscation component 114A, as described herein. In some embodiments, one or more components of computing system 101 can be omitted.

FIG. 1C illustrates an example computing system 102 that includes a memory system in accordance with some embodiments of the present disclosure. The memory system can include a memory controller 115 and a memory 120, as described with respect to FIG. 1A. The computing system 102 includes a processor 110 that is coupled to memory controller 115, as described with respect to FIG. 1A. The memory 120 includes local controller 122, as described with respect to FIG. 1B.

In some embodiments, memory controller 115 can implement an obfuscation component 114C. Obfuscation component 114C can perform similar operations of obfuscation component 114A and 114B, as described herein. In some embodiments, local controller 122 can implement obfuscation component 114D. Obfuscation component 114D can perform similar operations of obfuscation component 114A, 114B, and 144C, as described herein. In some embodiments, obfuscation component 114C and obfuscation component 114D can operate in conjunction to implement the systems and methods for protecting data of a memory as described herein. The operations performed by obfuscation component 114C and obfuscation component 114D can be the same or similar operations, in some embodiments. In other embodiments, obfuscation component 114A and obfuscation component 114B can perform different operations and/or work together perform the operations described herein. Obfuscation component 114A, obfuscation component 114B, obfuscation component 114C, and obfuscation component 114D are generally referred to as "obfuscation component 114" herein.

Figure 1D:
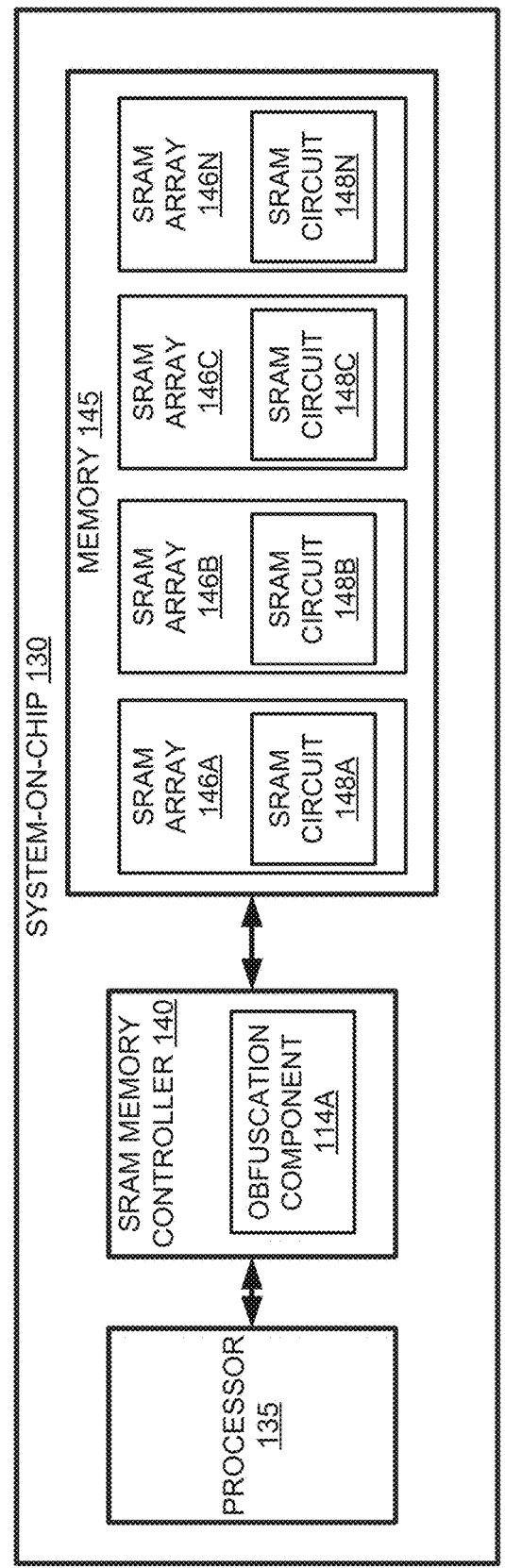
FIG. 1D illustrates an example system-on-chip (SoC) that includes an SRAM memory, in accordance with some embodiments of the disclosure.

FIG. 1D illustrates a system-on-chip ("SoC") 130, in accordance with some embodiments of the present disclosure. An SoC can refer to an integrated circuit that integrates multiple components of a system. In some embodiments, SoC 130 can include processor 135, SRAM memory controller 140, and memory 145 integrated on the same die (e.g., on SoC 130), as illustrated. Processor 135 can be coupled to SRAM memory controller 140. The processor 135 uses the SRAM memory controller 140, for example, to write data to the memory 145 and read data from the memory 145.

The SRAM memory controller 140 can communicate with the memory 145 to perform operations such as reading data, writing data, or erasing data within the memory 145 and other such operations. The SRAM memory controller 140 can include hardware such as one or more integrated circuits and/or discrete components, a buffer memory, or a combination thereof. The hardware can include a digital circuitry with dedicated (i.e., hard-coded) logic to perform the operations described herein. The SRAM memory controller 140 can be a processor capable of interfacing between processor 135 and memory 145. In some embodiments, SRAM memory controller 140 can include obfuscation component 114A. Obfuscation component 114A can implement the systems and methods for protecting data of a memory, as described herein, such as with respect to FIG. 1A.

The memory 145 can be SRAM memory composed of SRAM array 146A through 146N (referred to generally as "SRAM array 146" herein) that each respectively include an SRAM circuit 148A through 148N (referred to generally as SRAM circuit 148). In some embodiments, SRAM circuit 148 can include SRAM memory cells composed of bit stable latching circuitry to store binary values, such as "0" or "1."

SRAM memory cells can be made of multiple metal-oxide-semiconductor field-effect transistors (MOSFETs). The intersection of a row and a column may correspond to the address of the memory cell within an SRAM array 146. Depending on the cell type, a cell can store one or more bits of binary data and may have various logic states that correlate to the number of bits stored.

Figure 1E:
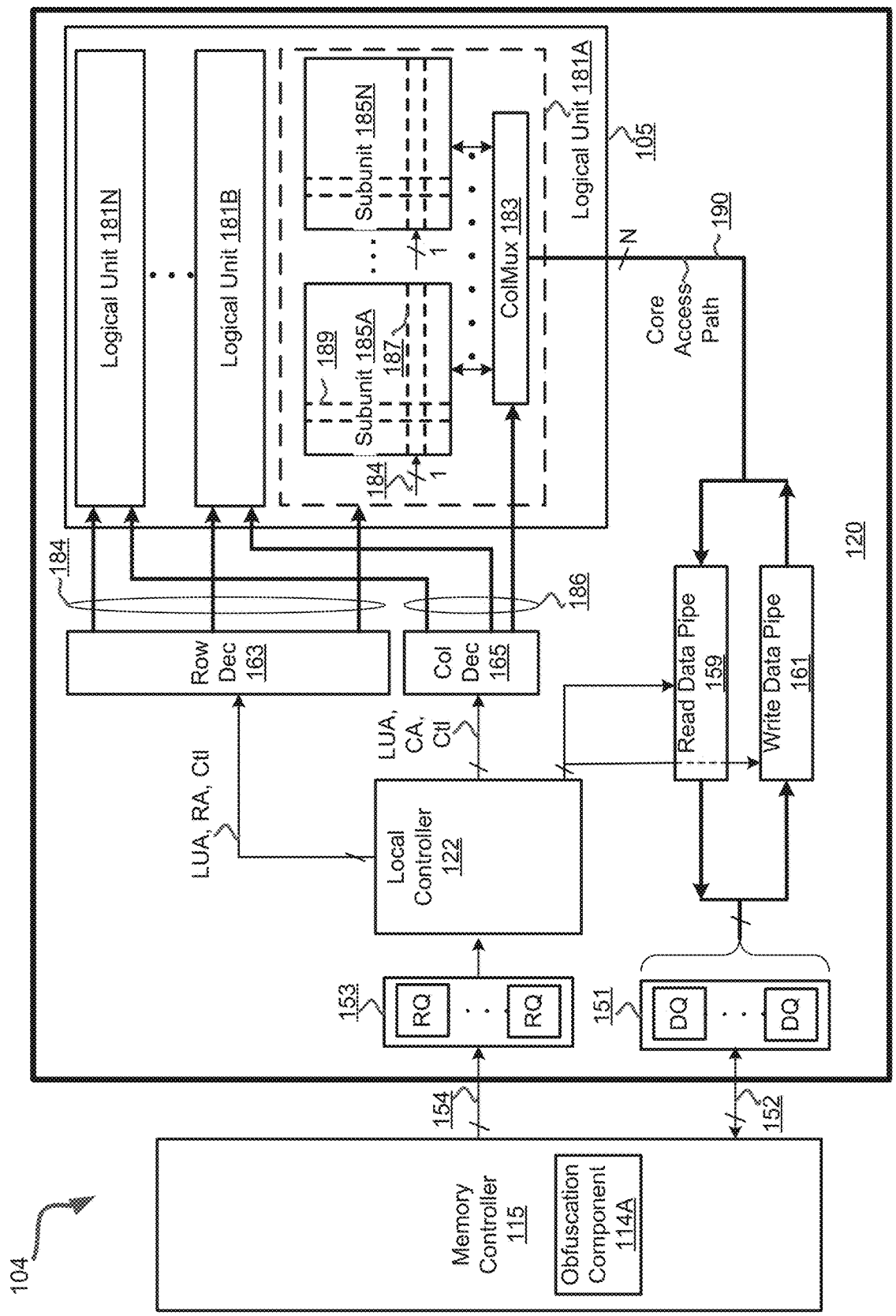
FIG. 1E is a block diagram of a memory in communication with a memory controller of a memory system, in accordance with some embodiments of the present disclosure.

FIG. 1E is a simplified block diagram of a first apparatus, in the form of a memory 120, in communication with a second apparatus, in the form of a memory controller 115 of a memory system 104, according to an embodiment. In the particular embodiment shown, and other embodiments disclosed herein, the memory 120 is a dynamic random access memory (DRAM) device that includes, among its component circuit blocks, a data interface 151, a request interface 153, a local controller 122, read and write data pipes 159 and 161, row and column decoders 163 and 165, and memory array 105. In alternative embodiments, the memory 120 may be any other type of memory, and in particular any type of volatile memory, which may benefit from improved systems and methods for protecting data of a memory using obfuscation component 114A. Although illustrated at memory controller 115, obfuscation component 114A can alternatively be located at local controller 112 (e.g., obfuscation component 114B), in some embodiments. In other embodiments, the obfuscation component 114A can be located at memory controller 115 and obfuscation component 114B can be located at local control 122. The request interface 153 is coupled to receive memory access requests (e.g., memory operation requests) and configuration requests from memory controller 115 or other control device via external request path 154, and the data interface 151 is coupled to receive write data from memory controller 115 and transmit read data to memory controller 115 via external data path 152. In one embodiment, the request interface 153 is a unidirectional synchronous interface that includes a bank of sampling circuits to sample incoming request signals in response to one or more timing signals (e.g., clock signals or strobe signals conveyed on separate signal lines or recovered from the data or request signals using clock-data recovery techniques), thereby recovering multi-bit requests that are passed to the local controller 122. The data interface 151 is a bidirectional synchronous interface having sampling circuits to sample incoming write data signals (or other information) in response to one or more timing signals as well as output driver circuits to transmit read data signals in response to a transmit clock signal or strobe signal. In an alternative embodiment, separate unidirectional interfaces may be provided for receipt of write data and transmission of read data, and/or the request interface 153 may be bidirectional, for example, to enable requests to be acknowledged or to allow the memory 120 to initiate requests to the memory controller. Also, request signals and/or data signals may be conveyed between the memory controller 115 and memory 120 asynchronously in alternative embodiments. The external signal paths 152, 154 may each be implemented by single-ended or differential point-to-point signaling links and/or multi-drop signaling links. In one embodiment, each incoming request is received in a sequence of transfers over the request path 154, with the individual time slices of the request being accumulated within the local controller 122 until the entire request is received (alternatively, if the request path is wide enough, all the bits of a request may be received in a single transfer over the request path) and includes an operation code which indicates the nature of the requested operation (e.g., row activation, column read, column write, precharge, register write, refresh, etc.) and, in the case of a memory access request, one or more address values that specify the row and/or column to be accessed within the memory array 105. Alternatively, the one or more addresses or any of them may be conveyed in time multiplexed fashion over the external data path 152 or via a dedicated address signal path. The local controller 122 decodes the incoming requests and issues control and timing signals to other circuit blocks within the memory 120 to carry out the requested operation, including issuing row address, logical unit address and control information (RA, LUA, Ctl) to the row decoder 163 in response to a row activation request, and column address, logical unit address and control information (CA, LUA, Ctl) to the column decoder 165 and load control information to the read data pipe 159 and write data pipe 161 in response to column access requests. In some embodiments, the memory controller 115 includes obfuscation component 114. The obfuscation component 114 can implement improved systems and methods for protecting data in a memory (e.g., memory 120).

In the particular embodiment shown in FIG. 1E, the memory array 105 includes multiple independently addressable logical units 181A through 181N (generally referred to as "logical units 181" herein) of memory cells, each of which includes multiple subunits 185A through 185N (generally referred to as "subunits 185" herein). Each of the subunits 185 includes memory cells arranged in rows 187 and columns 189, with word lines 184 coupled to each row of memory cells and bit lines (not shown) coupled to each column of memory cells. Each subunit 185 additionally includes a set of sense amplifiers (not shown in FIG. 1B) coupled to the bit lines, the set of sense amplifiers for each logical unit 181 of memory cells constituting a sense amplifier bank. Note that the sense amplifiers may be viewed as an entity separate from the subunits 185, logical units 181 or memory array 105. During a row activation operation, initiated in response to a row activation request, the local controller 122 provides a logical unit address (LUA) and row address (RA), received with or in association with the request, to the row decoder 163 and asserts a decode-enable signal (i.e., part of the control information, Ctl) to enable a row decoding operation therein. The row decoder 163 responds to the decode-enable signal by decoding the logical unit address to select one of the logical units 181 for row activation, and decoding the row address to activate the row-address-specified one of the word lines 184 within the selected logical unit 181. Word line activation enables the contents of the corresponding row of memory cells (i.e., the storage cells coupled to the activated word line) to drive the bit lines within each of the subunits 185 of the address-selected logical unit 181. Simultaneously with word line activation, or after a period of time sufficient to enable the stored data to appear on the bit lines, the row decoder 163 also activates a sense-enable line to enable the contents of the address-selected row to be captured within the sense amplifiers of the address-selected logical unit 181, thus concluding the row activation operation. In one embodiment, the word lines 184 for each logical unit 181 are composed of word line segments that extend across respective subrows of memory cells within each subunit 185 of the address-selected logical unit 181, and the sense enable line for each logical unit 181 is similarly segmented across the subunits 185. In Such an embodiment, a row activation operation may involve activation of each of the word line segments and sense-enable line segments (or a subset thereof) to enable capture of the output data in the sense amplifiers of each subunit 185 of the selected logical unit 181. It should be noted that the subunits 185 may be oriented in various alternative positions relative to each other, for example, to simplify signal routing and/or reduce switching noise. Once a storage row has been activated (i.e., content of the row of memory cells transferred to the corresponding set of sense amplifiers), column access operations may be directed to the activated row to read and write data at selected column locations within the sense amplifiers of an address-selected bank. In a memory read operation, for example, a bank address and a column address are supplied to the column decoder 165 along with a decode-enable signal (i.e., part of the control information, Ctl). When the decode-enable signal is asserted, the column decoder 165 switchably connects, via signal lines 186 coupled to column multiplexer 183 (ColMux), data nodes within an address-selected column of sense amplifiers (within a logical unit 181 selected by the bank address) to core access path 190 (i.e., an internal data path of the memory), thus enabling a selected column of read data within the activated row to be transferred to the read data pipe 159. In one embodiment, a predetermined period of time after asserting the column-decode enable signal (i.e., a time sufficient for the read data to become valid on core access path 190 at the input of the read data pipe 159), the local controller 122 issues a load signal to the read data pipe 159 to enable data to be loaded from the core access path 190 into the read data pipe 159. Thereafter, the read data is shifted out of the read data pipe 159 to the data interface 151 and transmitted to the memory controller 115 via the external data path 152. After a sequence of column reads (or at least one column read) directed to respective columns of the activated row have been completed, a precharge operation is performed to prepare the sense amplifier bank and corresponding bit lines for a subsequent row activation operation. In a memory write operation, the data flow direction is reversed. Write data is received in the data interface 151 via the external data path 152, and shifted into the write data pipe 161 in response to load timing signals from the local controller 122. Within the write data pipe 161, the write data is deserialized (i.e., converted into a more parallel bit format) and driven onto the core access path 190. Write masking information, received via the data interface or other signaling path (e.g., with the request), may be used to indicate specific bytes or other data units within the overall set of incoming write data that are to be written, with all other data units being masked (i.e., not written). As in the data read operation, the column decoder 165 switchably-connects, via multiplexer 183, signal lines of the core access path 190 to an address selected column of the sense amplifiers, enabling the write data to be captured (i.e., stored) in the data nodes of the column sense amplifiers and thus effecting the column write operation.

Figure 2:
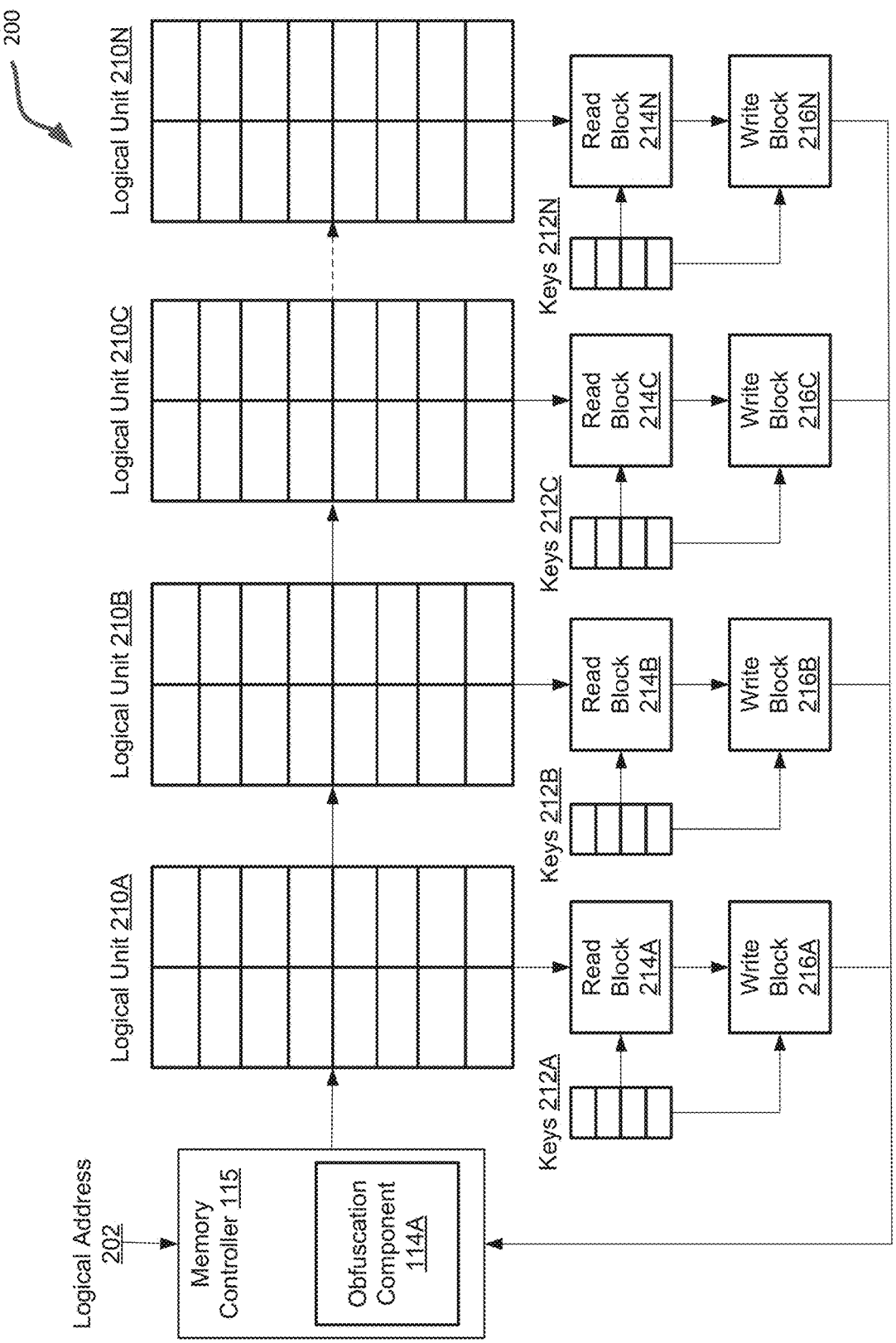
FIG. 2 is a diagram illustrating obfuscation of data in a memory, in accordance with some embodiments of the present disclosure.

FIG. 2 is a diagram illustrating obfuscation of data in a memory, in accordance with some embodiments of the present disclosure. Diagram 200 may include similar elements as illustrated computing system 100, computing system 101, computing system 102, SoC 130, memory system 104, as described with respect to FIG. 1A through FIG. 1E, respectively. It should be noted that elements of FIG. 1A through FIG. 1E can be used herein to help described FIG. 2. The operations described with respect to FIG. 2 are shown to be performed serially for the sake of illustration, rather than limitation. Although shown in a particular sequence or order, unless otherwise specified, the order of operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It should be noted that obfuscation component 114A can be configured to perform operations with respect to memory described herein. However, memory controller 115 will be referred to herein to perform the operations, acknowledging that obfuscation component 114A is performing the operations. In some embodiments, obfuscation component 114A can reside within memory controller 115. In some embodiments, obfuscation component 114A can reside within SRAM memory controller 140. In some embodiments, obfuscation component 114B can reside within local controller 122 of memory 120, as described with respect to FIG. 1B, and can be configured to perform operations described herein. In some embodiments, obfuscation component 114C can reside within memory controller 115, as described with respect to FIG. 1C, and can be configured to perform operations described herein. In some embodiments, obfuscation component 114D can reside within local controller 122 of memory 120, as described with respect to FIG. 1C, and can be configured to perform operations described herein.

Memory controller 115 can be configured to identify a requested memory operation (e.g., a read request, a write request, a partial write request, etc.) in a memory (e.g., memory 120, memory 145, etc.). In some embodiments, the requested memory operation can be received from a processor (e.g., processor 110, processor 135, etc.). Memory controller 115 can identify a memory address associated with the memory request. The identified memory address can correspond to an addressable location in the memory to perform the requested memory operation. A portion of the memory address can include one or more control signals, as described above with respect to FIG. 1A and FIG. 1E. In some embodiments, a portion of the memory address can include a bank select. The bank select can indicate a logical unit to perform the requested memory operation. The memory is logically partitioned into logical unit 210A, logical unit 210B, logical unit 210C, through logical unit 210N (generally referred to as "logical unit 210" herein), as illustrated. It can be noted that, in some embodiments, logical unit 210A through 210N can correspond to logical unit 181A through 181N, described with respect to FIG. 1E. In other or similar embodiments, a portion of the memory address can include a bank offset. The bank offset can indicate an addressable location within the identified logical unit to perform the memory operation. For example, the bank select can provide an indication to perform the requested memory operation at logical unit 210A and the bank offset can provide an indication to perform the requested memory location at a particular addressable memory location within logical unit 210A.

Memory controller 115 can identify address mask data (also referred to as "transformation data" herein). Memory controller 115 may use address mask data to transform a memory address into multiple transformed addresses, as described above. In some embodiments, memory controller 115 can identify address mask data for one or more logical units, and in some cases for each logical unit. For, example a single memory address can be transformed into multiple transformed addresses where each of the transformed addresses correspond to a particular logical unit 210A through 210N and is transformed using a specific one of a set of mask data.

In some embodiments, one portion of a transformed address can correspond to a bank select and another portion of the transformed address can correspond to a bank offset. The bank offset can indicate a particular addressable location within a logical unit indicated by the bank select, as described above. The bank select portions of the transformed addresses can be used to identify a logical unit for each transformed address. The bank offset can be used to identify the transformed address for each logical unit.

In some embodiments, memory controller 115 can use a bitwise function to transform a memory address into a transformed address using address mask data. In some embodiments, address mask data can be a bitmask. The bitmask can be a binary number (e.g., address mask data) that is used to perform bitwise functions on another binary number (e.g., a memory address). It should be noted that the bitwise function can include a combination of one or more bitwise operations. In some embodiments, the bitwise operations can include bitwise complement (NOT), bitwise and (AND), bitwise or (OR), bitwise exclusive or (XOR), etc. In an illustrative example, memory controller 115 can use an XOR bitwise operation to transform the memory address into multiple transformed addresses using address mask data, as described below with respect to FIG. 3.

Figure 3:
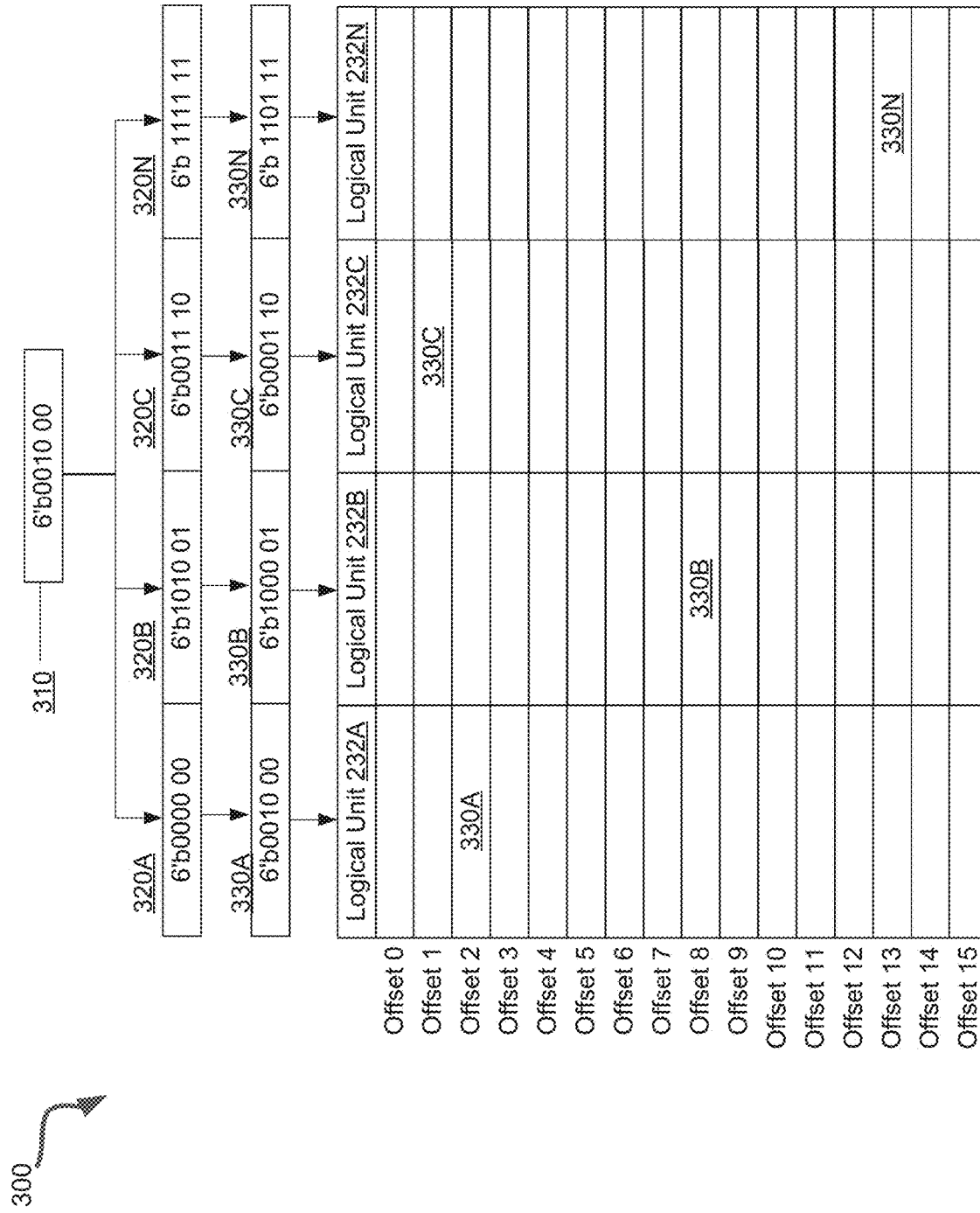
FIG. 3 illustrates generating transformed addresses using a memory address and address mask data, in accordance with some embodiments of the present disclosure.

FIG. 3 illustrates generating transformed addresses 330A through 330N using memory address 310 and address mask data 320A through 330N, in accordance with some embodiments of the present disclosure. It can be noted that while aspects of the present disclosure can be applied any number of logical units, FIG. 3 illustrates an embodiment using four logical units by way of illustration and not by way of limitation. In an illustrative embodiment, memory address 310 can be a 6-bit logical address "6'b0010 00." Memory controller 115 can identify address mask data 320A corresponding to logical unit 232A. Address mask data 320A can be a 6-bit bit-string "6'b0000 00." Memory controller 115 can generate transformed address 330A by performing an XOR bitwise function using memory address 310 and address mask data 320A. The resulting transformed address 330A can be a 6-bit transformed address "6'b0010 00." The two least significant bits ("00") of transformed address 330A correspond to a bank select of transformed address 330A. The bank select ("00") of the transformed address 330A designate logical unit 232A as the corresponding logical unit. The four most significant bits ("0010") of transformed address 330A correspond to the bank offset of transformed address 330A. The bank offset ("0010") of transformed address 330A designate offset 2. Accordingly, transformed address 330A corresponds to offset 2 of logical unit 232A.

In some embodiments, memory controller 115 can generate transformed address 330B by performing an XOR bitwise function using memory address 310 and address mask data 320B corresponding to logical unit 232B. The resulting transformed address 330B can be a 6-bit transformed address "6'b1000 01." The two least significant bits ("01") of transformed address 330B correspond to a bank select of transformed address 330B. The bank select ("01") of the transformed address 330A designate logical unit 232B as the corresponding logical unit. The four most significant bits ("1000") of transformed address 330B correspond to a bank offset of transformed address 330B. The bank offset ("1000") of transformed address 330B designate offset 8. Accordingly, transformed address 330B corresponds to offset 8 of logical unit 232B.

Memory controller 115 can generate transformed address 330C by performing an XOR bitwise function using memory address 310 and address mask data 320C corresponding to logical unit 232C. The resulting transformed address 330C can be a 6-bit transformed address "6'b0001 10." The two least significant bits ("10") of transformed address 330C correspond to the bank select of transformed address 330C. The bank select ("10") of the transformed address 330B designate logical unit 232C as the corresponding logical unit. The four most significant bits ("0001") of transformed address 330C correspond to the bank offset of transformed address 330C. The bank offset ("0001") of transformed address 330C designate offset 1. Accordingly, transformed address 330C corresponds to offset 1 of logical unit 232C.

Memory controller 115 can generate transformed address 330N by performing an XOR bitwise function using memory address 310 and address mask data 320N corresponding to logical unit 232N. The resulting transformed address 330N can be a 6-bit transformed address "6'b1101 11." The two least significant bits ("11") of transformed address 330N correspond to the bank select of transformed address 330N. The bank select ("11") of the transformed address 330N designate logical unit 232N as the corresponding logical unit. The four most significant bits ("1101") of transformed address 330N correspond to a bank offset of transformed address 330N. The bank offset ("1101") of transformed address 330N designate offset 13. Accordingly, transformed address 330C corresponds to offset 13 of logical unit 232N.

Returning to FIG. 2, in some embodiments, address mask data can be received by memory controller 115 and stored within the memory for identification at subsequent memory operations. In some embodiments, address mask data can be generated by memory controller 115 and stored at the memory. In some embodiments, address mask data can be generated (e.g., via memory controller 115) every power cycle. In particular for a volatile memory, the address mask data can be generated every power cycle (or at least across different power cycles) such that for each power cycle the address mask data is different. In some embodiments implementing a volatile memory, address mapping of memory addresses to addressable locations (e.g., transformed addresses) within the logical units can be unique for each power cycle. By using different address mask data over different power cycles, techniques that maliciously extract data (e.g., via invasive probing, photonic analysis, side-channel analysis) of a memory by exploiting a fixed mapping of addresses across power cycles may be addressed.

The memory system can be configured to perform the memory operation at the transformed addresses. In some embodiments, the transformed memory addresses can include a target address and one or more additional addresses (also referred to as "dummy addresses" herein). The target address can correspond to a logical unit and the one or more dummy addresses can correspond to one or more other logical units. For example, the target address can correspond to logical unit 210A and the one or more dummy addresses can correspond to logical units 210B through 210N. In other or similar embodiments, performing the memory operation includes performing the memory operation at the target address and performing one or more dummy memory operations on the corresponding dummy addresses. In some embodiments, performing the memory operation at the target address and performing the dummy memory operations at the dummy addresses includes performing a read operation at the target address and the dummy addresses, and performing a write operation at the target address and the additional address.

In some embodiments, read block 214A through 214N (referred to generally as "read block 214" herein) illustrates execution operations in performing read operations. It should be noted that, in some embodiments, obfuscation component 114 can be configured to perform operations with respect to read block 214. However, read block 214 will be referred to herein to perform the operations, acknowledging that obfuscation component 114 is performing the operations at least in some embodiments. To perform a read operation, read block 214 can retrieve data stored at a transformed address (e.g., a target address or a dummy address). In some embodiments, data stored at a target address can include target data. Target data can be data associated with a requested memory operation. If the requested memory operation is a read request, the target data can correspond to data designated by the read request to be retrieved from the target address and sent (e.g., via external data path 152) to processor (e.g. processor 110, processor 135, etc.). In some embodiments, data stored at dummy addresses can include dummy data. Dummy data can be data associated with performing dummy memory operations at the dummy addresses, as described in detail below.

In some embodiments, write block 216A through 216N (referred to generally as "write block 216" herein) illustrates execution operations in performing write operations. It should be noted that, in some embodiments, obfuscation component 114 can be configured to perform operations with respect to write block 216. However, write block 216 will be referred to herein to perform the operations, acknowledging that obfuscation component 114 is performing the operations at least in some embodiments. To perform a write operation, write block 216 can store data at a transformed address (e.g., target address or dummy address). If the requested memory operation is a write request, write block 216 can identify write data associated with the write request. In some embodiments, write data can include data designated by the memory operation to be written to the memory address. Write block 216 can store the write data at the target address. For example, write block 216A can receive (e.g., via external request path 154) write data from processor 110 and store the write data within logical unit 210A at the target address. In some embodiments, write data received from processor 110 can replace or be merged (e.g., partial write) with read data stored at the target address before storing the write data at the target address. In some embodiments, write block 216 can store dummy data at dummy addresses, as described in detail below.

As mentioned above, performing the memory operation at the target address and performing the dummy memory operations at the dummy addresses can include performing read operations at the target address and at the dummy addresses, and performing write operations at the target address and the dummy addresses. In some embodiments, read block 214 can perform the read operations. Read block 214 can retrieve target data stored at a target address and dummy data stored at dummy addresses. In some embodiments, the retrieved target data and dummy data can be encrypted. Read block 214 can decrypt the encrypted target data and the encrypted dummy data using corresponding keys of keys 212A through 212N (generally referred to as "keys 212" herein). In some embodiments, different sets of cryptographic keys, illustrated by keys 212A through 212N, can be associated with each logical unit 210A through 210N (generally referred to as "logical unit 210" herein). Keys 212 can include a key management system that can manage a set of keys for each logical unit 210, as described in further detail below. If the memory operation is a read request, read block 214 can read the decrypted target data to the processor, as described above. For example, read block 214A can retrieve the encrypted target data stored at the target address within logical unit 210A and decrypt the target data using a corresponding key of keys 212A. If the memory operation is a read operation, read block 214A can send the decrypted target data to the processor. Additionally, read blocks 214B through 214N can retrieve the encrypted dummy data stored at the dummy addresses within logical units 210B through 210N, and decrypt the encrypted dummy data using corresponding keys of keys 212B through 212N. It can be noted that in some embodiments, the dummy data may not be sent to the processor, even if the memory operation is a read request. In some embodiments, write block 216 can perform the write operations. Write block 216 can encrypt the write data and the decrypted dummy data using corresponding keys of keys 212 (as described in further detail below). In some embodiments, write block 216 can identify and use the same or different keys within keys 212 than the keys used by read block 214 to decrypt the target data and dummy data. If the memory operation is a write request, write block 216 can replace the target data with write data associated with the write request by storing the write data at the corresponding logical unit 210. Write block 216 can encrypt write data using keys 212 and store the encrypted write data at the corresponding logical unit 210. For example, write block 216A can encrypt the write data using a new key identified from keys 212A and store the encrypted write data at logical unit 210A. Additionally, write blocks 216B through 216N can encrypt the decrypted dummy data using new keys identified from the corresponding keys 212B through 212N and store the re-encrypted dummy data within logical units 210B through 210N at the corresponding dummy addresses. Decrypting and encrypting dummy data with a new key (e.g., via read block 214 and write block 216 respectively) can be included in a performance of a dummy operation. It can be noted that, in some embodiments, the dummy data is not overwritten by new data, even if the memory operation is a write request. Rather, the dummy data can be re-encrypted with new cryptographic keys. In some embodiments, only the decrypted target data is changed, but the dummy data may appear to change due to being re-encrypted using new cryptographic keys. If an adversary is able to determine stored data has changed after a memory operation (e.g., via invasive probing), the adversary may yet be unable to differentiate between dummy data and target data—providing an additional layer of protection for the memory.

It can be noted that different implementations using the set of cryptographic keys corresponding to each of the logical units 210A through 210N is contemplated. For example, in some embodiments for each write operation performed with respect to write block 216A through write block 216N, a new key from the respective set of keys block 212A through 212N can be used. The keys 212A through 212N can be used and, in some cases re-used, in a predetermined order, random order, or pseudo-random order. In some embodiments, for each write operation performed with respect to write block 216A through write block 216N can be performed N-number of times before using a next key of the respective set of keys 212A through 212N.

In some embodiments, write block 216 can identify data masks. It can be noted that data masks are differentiated from address mask data herein. Data masks refer to data, such as a bitstring, used to transform original data to masked data in a structurally similar format as the original data. Masked data can be used in place of the original data to perform operations (e.g., encryption, decryption, etc.) associated with the original data. Data masks may be used to mask data (e.g., target data and dummy data) stored within a memory. In some embodiments, write block 216 can use the data masks to mask the target data/write data and dummy data prior to encrypting target data/write data and dummy data. Read block 214 can unmask target data/write data using the identified data masks subsequent to decrypting target data/write data and dummy data. In some embodiments, read block 214 and write block 216 can use a bitwise function to perform the masking operations. It should be noted that the bitwise function can include a combination of one or more bitwise operations. In some embodiments, the bitwise operations can include bitwise complement (NOT), bitwise and (AND), bitwise or (OR), bitwise exclusive or (XOR), etc.

In an illustrative example, read block 214A can decrypt target data using a corresponding key (e.g., key0) managed by keys 212A. Responsive to decrypting the target data, read block 214A can unmask the decrypted target data by performing an XOR operation on the decrypted target data and corresponding data mask (e.g., mask0) managed by keys 212A. Read block 214A or write block 214A can perform the requested memory operation using target data or write data, as described above. Write block 216A can mask the target data/write data by performing an XOR operation on the decrypted target data/write data and a new data mask (e.g., mask1) managed by keys 212A. Responsive to masking the target data/write data, write block 216A can encrypt the masked target data/write data using a new key (e.g., key1) managed by keys 212A. Read blocks 214B through 214N and write blocks 214B through N can be configured to perform similar decryption/encryption operations and masking/unmasking operations on corresponding dummy data using keys and masks managed by keys 212B through N. In some embodiments, read block 216 and/or write block 216 can perform the masking and unmasking operations described above using a differential mask. For example, read block 214A or write block 216A can perform an XOR operation on mask0 and mask1 to create a differential mask. Read block 214A or write block 216A can mask the decrypted target data/write data prior to encryption by performing an XOR operation on the decrypted target data/write data using the differential mask.

Keys associated with encryption/decryption, the operations thereof and described above and data masks associated with the masking/unmasking operations described above can be represented by keys 212A through 212N (also referred to as "keys block" herein for purposes of clarity). It can be noted that in some embodiments, obfuscation component 114 can be configured to perform operations with respect to keys block 212A through 212N. In some embodiments, the keys blocks 212A through 212N can include logic executed by memory controller 115. In some embodiments, each of keys block 212A through 212N can include a set of key entries. Each key entry can include one or more of a key and a data mask. For example, keys block 212A can manage a set of key entries associated with logical unit 210A and provide keys and data masks to read block 214A and write block 216A. Keys blocks 212A through 212N can determine which key and/or mask to provide to read block 214A through 214N and write block 216A through 216N based on a key entry identifier. The key entry identifier may indicate a key entry of keys blocks 212A through 212N. Target data and dummy data may include metadata that includes a corresponding key entry identifier. Metadata associated with target data and dummy data may be stored at target address and dummy addresses, respectively. It can be noted that the metadata may not be encrypted, in many embodiments. Keys blocks 212A through 212N can provide the correct key and mask to read block 214A through 214N based on a key identifier identified within corresponding metadata of target data/dummy data. For example, read block 214A can provide a key entry identifier (e.g., kID0) to keys block 212A according to metadata of target data/dummy data. Responsive to identifying the provided key identifier, keys block 212A may send one or more of a key (e.g., key0) and a data mask (e.g., mask0) corresponding to the key entry identifier. Keys blocks 212A through 212N can provide a new key and data mask to write block 216A through 216N for performance of encryption and masking operations on target data/dummy data. For example, keys block 212A may provide a new key (e.g., key1), a new data mask (e.g., mask1), and a corresponding key entry identifier (e.g., kID1) to write block 216A. write block 216A may use the new key and new data mask to perform encryption and masking operations on dummy data/target data, as described above. Write block 216A may update metadata of the dummy data/target data to include the key entry identifier associated with the new key and the new data mask.

In some embodiments, metadata can be stored with corresponding dummy data or target data, as described above. In at least one embodiment, metadata can be stored at a separate location within a different logical unit than the corresponding dummy data or target data. For example, target data can be stored at logical unit 210A and metadata associated with the target data can be stored at logical unit 210B.

In some embodiments, each key entry may include a use counter. The use counter may track the number of times a key and data mask have been used. When the key and data mask have been used a designated number of times, the key entry may be updated with one or more of a new key and a new data mask, and the use counter may be reset to zero. The previous key and data mask may be moved to a memory for storage of previously used keys. In some embodiments, each key entry may include a key version. The key version may indicate the number of times the key entry has been updated. In some embodiments, responsive to a key entry being updated a designated number of times, a full refresh of all keys and masks can be performed. A full refresh can include retrieving all data stored within logical unit 210A through 210N. Read block 214 can decrypt/unmask the retrieved data using corresponding keys and data masks managed by keys blocks 212. Keys blocks 212 can update all key entries. Updating key entries can include updating keys to a random value, updating data masks to a random value, setting use counters to zero, and setting key versions to zero. Key blocks 212 can provide updated keys to write blocks 216 to encrypt/mask the retrieved data using the updated keys and data masks.

In some embodiments, keys and data masks may be received by keys blocks 212 and stored in a record (e.g., data structure) with entries for identification at subsequent memory operations. The record can be a collection of related data (e.g., keys) stored at the memory for identification (e.g., via keys blocks 212) at subsequent memory operations. In some embodiments, one or more of keys and data masks may be generated by keys blocks 212 for identification and use at subsequent memory operations. In some embodiments, keys blocks 212 may generate keys and data masks every power cycle. In particular for a volatile memory, the address mask data may be generated every power cycle such that for each power cycle the address mask data is different.

In embodiments that implement a volatile memory embodiment, one or more of the keys and masks for performing cryptographic operations on data stored at logical units may be unique for each power cycle. Invasive techniques (e.g., invasive probing, side-channel analysis, photonic analysis, etc.) that can retrieve cryptographic keys and decrypt encrypted data stored in a memory are hindered by avoiding reuse of keys and by updating keys every power cycle.

Figure 4:
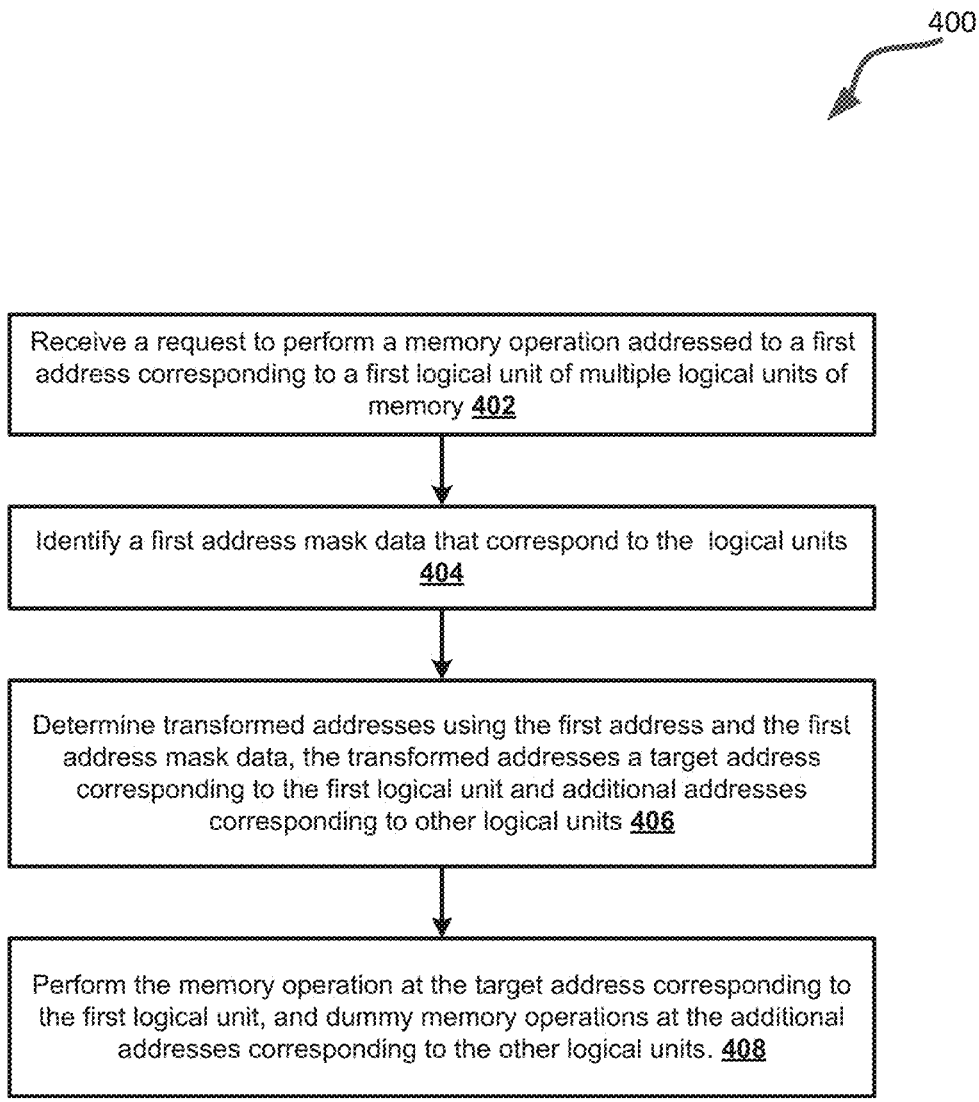
FIG. 4 depicts a flow diagram of an example method of obfuscating data in a memory, in accordance with some embodiments of the present disclosure.

FIG. 4 depicts a flow diagram of an example method of obfuscating data in a memory, in accordance with some embodiments of the present disclosure. The method 400 can be performed by processing logic that can include hardware (e.g., processing device, circuitry, dedicated logic, microcode, hardware of a device, integrated circuit, etc.), software (e.g., instructions run or executed on a processing device), or a combination thereof. In some embodiments, the method 400 is performed by obfuscation component 114A of FIG. 1A, FIG. 1D, or FIG. 1E. In some embodiments, the method 400 is performed by obfuscation component 114B of FIG. 1B. In some embodiments, the method 400 is performed at least in part by obfuscation component 114C of FIG. 1C. In some embodiments, the method 400 is performed at least in part by obfuscation component 114D of FIG. 1C. In some embodiments, method 400 is performed by obfuscation component 114C of FIG. 1C obfuscation component 114D of FIG. 1C, each working together to perform one or more operations of method 400. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 402 of method 400, a request to perform a memory operation is received. For example, processing logic (e.g., obfuscation component 114A) operating on a first processing device can receive, from a processor, a request to perform a memory operation addressed to a first address corresponding to a first logical unit of multiple logical units of a memory. In some embodiments, the memory may include a volatile memory.

At operation 404, a first address mask data is identified. For example, the processing logic can identify a first address mask data that correspond to the logical units. In some embodiments, responsive to performance of a power cycle of the memory, processing logic may identify a second address mask data that correspond to the logical units.

At operation 406, transformed addresses is determined. For example, the processing logic can determine multiple transformed addresses using the first address and the first address mask data. The transformed addresses can include a target address corresponding to the first logical unit and additional addresses corresponding to other logical units. In some embodiments, the first address mask data may include bitmasks. Processing logic can determine the transformed addresses using the first address and the first address mask data by, for each address mask data of the address mask data, performing a bitwise operation using the first address and a respective address mask data of the address mask data to obtain the transformed addresses.

At operation 408, the memory operation is performed. For example, processing logic can perform the memory operation at the target address corresponding to the first logical unit. Processing logic can perform dummy memory operations at the additional addresses corresponding to the other logical units.

In some embodiments, the request to perform the memory operation can include a write request. Processing logic can perform the memory operation at the target address corresponding to the first logical unit, and dummy memory operations at the additional addresses corresponding to the other logical units. To perform the memory operation and dummy memory operations, processing logic can perform a read operation at the target address and at the additional addresses and perform a write operation at the target address and at the additional addresses.

In some embodiments, the request to perform the memory operation may include a read request. Processing logic can perform the memory operation at the target address corresponding to the first logical unit, and the dummy memory operations at the additional addresses corresponding to the other logical units. To perform the memory operation and dummy memory operations, processing logic can perform a read operation at the target address and at the additional addresses and perform a write operation at the target address and at the additional addresses.

In some embodiments, to perform the read operation at the target address and at the additional addresses, processing logic can obtain target data stored at the target address and dummy data stored at each of the additional addresses. Processing logic can decrypt the target data using a first cryptographic key of a first set of cryptographic keys to obtain decrypted target data. Processing logic can decrypt each of the dummy data using respective keys of the first set of cryptographic keys to generate decrypted dummy data. In some embodiments, to performing the write operation at the target address and at the additional addresses, processing logic can encrypt the decrypted target read data using a second cryptographic key of a second set of cryptographic keys to obtain encrypted target data. Processing logic can encrypt each of the decrypted dummy data using respective keys of the second set of cryptographic keys to generate encrypted dummy data. In some embodiments, responsive to a performance of a power cycle of the memory, processing logic can identify a new one or more cryptographic keys that correspond to the memory.

Figure 5:
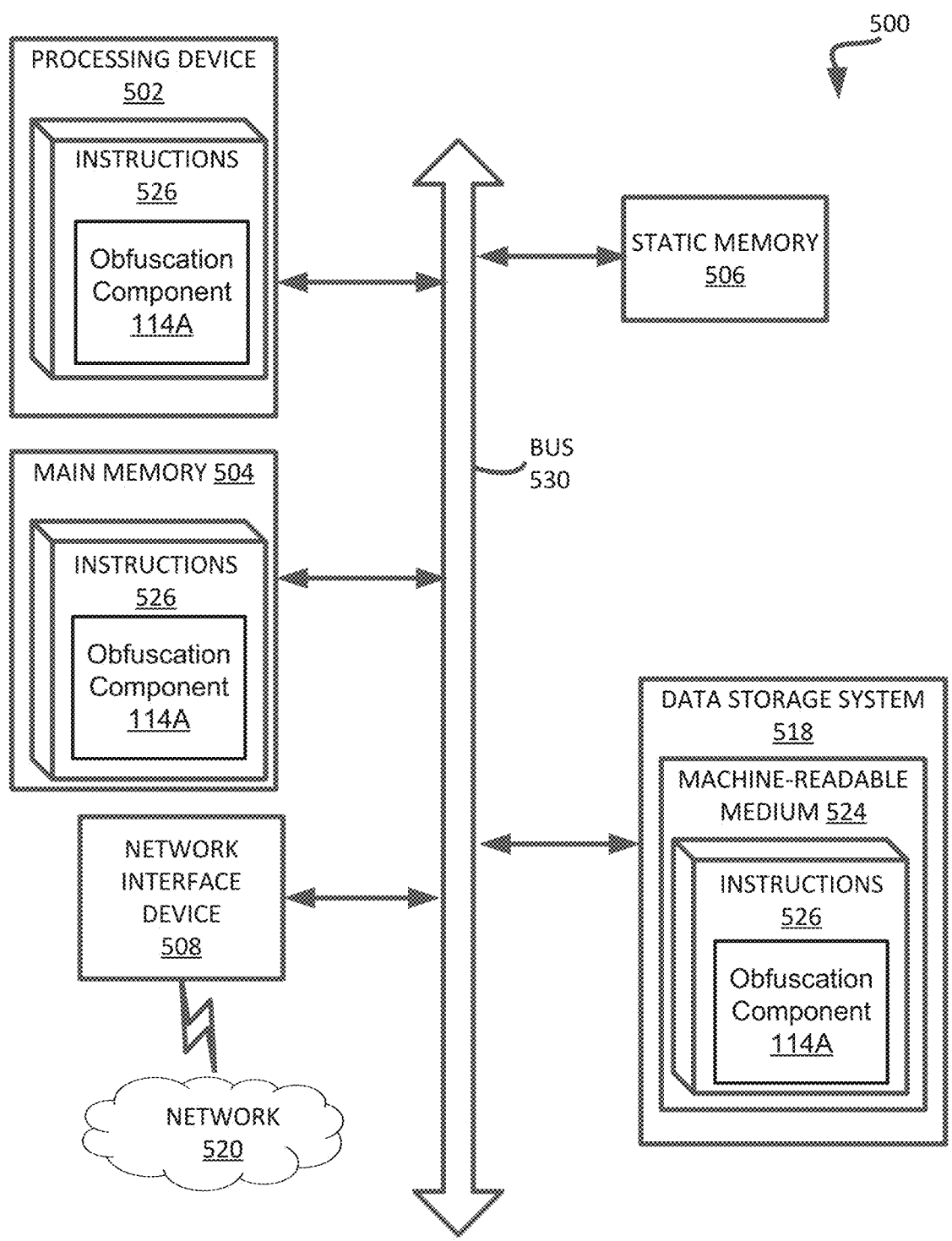
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a computer system that includes a processor (e.g., processor 110, processor 135, etc.) that is coupled to or utilizes a memory system (e.g., the memory controller 115 and memory 120 of FIG. 1A) or can be used to perform the operations of a controller (e.g., to perform operations corresponding to the local controller 122, the memory controller 115, or the SRAM memory controller 140 of FIG. 1). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein (e.g., operations of obfuscation component 114). The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. In some embodiments, the machine-readable storage medium 524, data storage system 518, and/or main memory 504 can correspond to the various memory systems described with respect to FIG. 1.

In one embodiment, the instructions 526 include instructions to implement functionality corresponding to the local controller 122, the memory controller 115, or the SRAM memory controller 140 of FIG. 1. In some embodiments, the instructions 526 include instructions to implement functionality corresponding to obfuscation component 114A, obfuscation component 114B, obfuscation component 114C, or obfuscation component 114D of FIG. 1 and FIG. 2. The obfuscation component 114A through 114D can implement improved systems and methods for protecting data in a memory. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein, the singular forms "a," "an," and "the" include plural references unless the context clearly indicates otherwise. Thus, for example, reference to "an active ingredient" includes a single active ingredient as well as a mixture of two or more different active ingredients. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
  receiving, by a controller, a request to perform a memory operation addressed to a first address corresponding to a first logical unit of a plurality of logical units of a memory;
  identifying a first plurality of address mask data that correspond to the plurality of logical units;
  determining a plurality of transformed addresses using the first address and the first plurality of address mask data, the plurality of transformed addresses comprising a target address corresponding to the first logical unit and a plurality of additional addresses corresponding to other logical units of the plurality of logical units; and
  performing the memory operation at the target address corresponding to the first logical unit, and dummy memory operations at the plurality of additional addresses corresponding to the other logical units of the plurality of logical units, wherein performing the memory operation at the target address and the dummy memory operations at the plurality of additional addresses comprises:
    performing a read operation at the target address and at the plurality of additional addresses; and
    performing a write operation at the target address and at the plurality of additional addresses.

2. The method of claim 1, wherein the request to perform the memory operation comprises a write request.

3. The method of claim 1, wherein the request to perform the memory operation comprises a read request.

4. The method of claim 3, wherein performing the read operation at the target address and at the plurality of additional addresses, comprises:
  obtaining target data stored at target address and dummy data stored at each of the plurality of additional addresses; and
  decrypting the target data using a first cryptographic key of a first plurality of cryptographic keys to obtain decrypted target data and each of the dummy data using respective keys of the first plurality of cryptographic keys to generate decrypted dummy data.

5. The method of claim 4, wherein performing the write operation at the target address and at the plurality of additional addresses, comprises:
encrypting the decrypted target data using a second cryptographic key of a second plurality of cryptographic keys to obtain encrypted target data and each of the decrypted dummy data using respective keys of the second plurality of cryptographic keys to generate encrypted dummy data.

6. The method of claim 4, further comprising:
responsive to a performance of a power cycle of the memory, identifying a new one or more plurality of cryptographic keys that correspond to the memory.

7. The method of claim 1, wherein the first plurality of address mask data comprises a plurality of bitmasks, and wherein determining the plurality of transformed addresses using the first address and the first plurality of address mask data comprises:
for each address mask data of the first plurality of address mask data, performing a bitwise operation using the first address and a respective address mask data of the first plurality of address mask data to obtain the plurality of transformed addresses.

8. The method of claim 1, wherein the memory comprises a volatile memory.

9. A method comprising:
receiving, by a controller, a request to perform a memory operation addressed to a first address corresponding to a first logical unit of a plurality of logical units of a memory;
identifying a first plurality of address mask data that correspond to the plurality of logical units;
determining a plurality of transformed addresses using the first address and the first plurality of address mask data, the plurality of transformed addresses comprising a target address corresponding to the first logical unit and a plurality of additional addresses corresponding to other logical units of the plurality of logical units;
performing the memory operation at the target address corresponding to the first logical unit, and dummy memory operations at the plurality of additional addresses corresponding to the other logical units of the plurality of logical units; and
responsive to a performance of a power cycle of the memory, identifying a second plurality of address mask data that correspond to the plurality of logical units.

10. A system comprising:
a memory; and
a controller, operatively coupled with the memory, to perform operations comprising:
receiving a request to perform a memory operation addressed to a first address corresponding to a first logical unit of a plurality of logical units of the memory;
identifying a first plurality of address mask data that correspond to the plurality of logical units;
determining a plurality of transformed addresses using the first address and the first plurality of address mask data, the plurality of transformed addresses comprising a target address corresponding to the first logical unit and a plurality of additional addresses corresponding to other logical units of the plurality of logical units; and
performing the memory operation at the target address corresponding to the first logical unit, and dummy memory operations at the plurality of additional addresses corresponding to the other logical units of the plurality of logical units, wherein performing the memory operation at the target address and the dummy memory operations at the plurality of additional addresses comprises:
performing a read operation at the target address and at the plurality of additional addresses; and
performing a write operation at the target address and at the plurality of additional addresses.

11. The system of claim 10, wherein the request to perform the memory operation comprises a write request.

12. The system of claim 10, wherein the request to perform the memory operation comprises a read request.

13. The system of claim 12, wherein performing the read operation at the target address and at the plurality of additional addresses, comprises:
obtaining target data stored at target address and dummy data stored at each of the plurality of additional addresses; and
decrypting the target data using a first cryptographic key of a first plurality of cryptographic keys to obtain decrypted target data and each of the dummy data using respective keys of the first plurality of cryptographic keys to generate decrypted dummy data.

14. The system of claim 13, wherein performing the write operation at the target address and at the plurality of additional addresses, comprises:
encrypting the decrypted target data using a second cryptographic key of a second plurality of cryptographic keys to obtain encrypted target data and each of the decrypted dummy data using respective keys of the second plurality of cryptographic keys to generate encrypted dummy data.

15. The system of claim 13, further comprising:
responsive to a performance of a power cycle of the memory, identifying a new one or more plurality of cryptographic keys that correspond to the memory.

16. The system of claim 10, further comprising:
responsive to a performance of a power cycle of the memory, identifying a second plurality of address mask data that correspond to the plurality of logical units.

17. The system of claim 10, wherein the first plurality of address mask data comprises a plurality of bitmasks, and wherein determining the plurality of transformed addresses using the first address and the first plurality of address mask data comprises:
for each address mask data of the first plurality of address mask data, performing a bitwise operation using the first address and a respective one of the first plurality of address mask data to obtain the plurality of transformed addresses.

18. The system of claim 10, wherein the memory comprises a volatile memory.

19. A non-transitory computer-readable storage medium comprising instructions that, responsive to execution by a controller, cause the controller to perform operations comprising:
receiving, by the controller, a request to perform a memory operation addressed to a first address corresponding to a first logical unit of a plurality of logical units of a memory;
identifying a first plurality of address mask data that correspond to the plurality of logical units;
determining a plurality of transformed addresses using the first address and the first plurality of address mask data, the plurality of transformed addresses comprising a target address corresponding to the first logical unit and a plurality of additional addresses corresponding to other logical units of the plurality of logical units; and performing the memory operation at the target address corresponding to the first logical unit, and dummy memory operations at the plurality of additional addresses corresponding to the other logical units of the plurality of logical units, wherein performing the memory operation at the target address and the dummy memory operations at the plurality of additional addresses comprises:

performing a read operation at the target address and at the plurality of additional addresses; and performing a write operation at the target address and at the plurality of additional addresses.

20. The non-transitory computer readable storage medium of claim 19, wherein the request to perform the memory operation comprises a write request.

21. The non-transitory computer readable storage medium of claim 19, wherein the request to perform the memory operation comprises a read request.

* * * * *